United States Patent
Houdebine et al.

(10) Patent No.: US 11,190,236 B2
(45) Date of Patent: Nov. 30, 2021

(54) NFC DEVICE EMULATED IN CARD MODE COMPRISING A DIGITAL PHASE LOCKED LOOP, AND CORRESPONDING COMMUNICATION METHOD

(71) Applicant: STMicroelectronics SA, Montrouge (FR)

(72) Inventors: Marc Houdebine, Crolles (FR); Laurent Jean Garcia, Le Champ Pres Froges (FR)

(73) Assignee: STMICROELECTRONICS SA, Montrouge (FR)

( * ) Notice: Subject to any disclaimer, the term of this patent is extended or adjusted under 35 U.S.C. 154(b) by 0 days.

(21) Appl. No.: 17/080,431

(22) Filed: Oct. 26, 2020

(65) Prior Publication Data
US 2021/0126672 A1 Apr. 29, 2021

(30) Foreign Application Priority Data
Oct. 28, 2019 (FR) ...................................... 1912076

(51) Int. Cl.
*H04B 5/00* (2006.01)
*H04W 56/00* (2009.01)
*H04L 7/033* (2006.01)

(52) U.S. Cl.
CPC ......... *H04B 5/0031* (2013.01); *H04B 5/0012* (2013.01); *H04L 7/033* (2013.01)

(58) Field of Classification Search
None
See application file for complete search history.

(56) References Cited

U.S. PATENT DOCUMENTS 5,351,014 A * 9/1994 Ichiyoshi ................ H03L 7/085
                                                         331/1 A
7,366,271 B2 * 4/2008 Kim ........................ H03L 7/087
                                                         375/376
(Continued)

FOREIGN PATENT DOCUMENTS

CN      103269220 A    8/2013
EP       2680457 A2    1/2014
(Continued)

OTHER PUBLICATIONS

Houdebine, M., et al, "An 85-GHz fully integrated all digital fractional frequency synthesizer for e-band backhaul and radar applications in 55-nm BiCMOS", ESSCIRC Conference 2015, 42nd European Solid-State Circuits Conference, Sep. 12-15, 2016, 4 pages.

(Continued)

*Primary Examiner* — Tuan A Tran
(74) *Attorney, Agent, or Firm* — Slater Matsil, LLP (57) ABSTRACT

An embodiment near-field communication device using active load modulation, in card emulation mode and intended to communicate with a reader, comprises a digital phase-locked loop configured to generate a carrier signal, having an oscillator configured to generate the carrier signal in a manner controlled by an analog control signal, a feedback circuit configured to generate a digital control signal, a digital-to-analog converter configured to convert the digital control signal into the analog control signal, and an integrator assembly configured to integrate the analog control signal.

24 Claims, 8 Drawing Sheets

(56) References Cited

U.S. PATENT DOCUMENTS

| | | | | |
|---|---|---|---|---|
| 7,493,095 | B2* | 2/2009 | Chuang | H03L 7/087 331/16 |
| 8,179,294 | B2* | 5/2012 | Karthaus | H03M 3/382 341/143 |
| 8,373,464 | B2* | 2/2013 | Sornin | H03L 7/081 327/156 |
| 9,014,323 | B2* | 4/2015 | Verlinden | H03L 7/0992 375/376 |
| 9,742,443 | B2* | 8/2017 | Mendel | H04B 15/04 |
| 9,929,779 | B2* | 3/2018 | Hung | H04B 5/0037 |
| 9,979,404 | B1* | 5/2018 | Drost | H03F 1/0294 |
| 9,985,775 | B2* | 5/2018 | Patapoutian | H03L 7/093 |
| 9,998,178 | B2* | 6/2018 | Dedieu | H04B 5/0031 |
| 10,020,931 | B2* | 7/2018 | Abdelmoneum | H03L 7/0995 |
| 10,122,527 | B1* | 11/2018 | Fischer | H03L 7/085 |
| 10,264,540 | B2* | 4/2019 | Yu | H04L 7/04 |
| 10,396,975 | B2* | 8/2019 | Hung | H03L 7/085 |
| 10,425,173 | B2* | 9/2019 | Cordier | H04B 5/0031 |
| 10,425,219 | B2* | 9/2019 | Lim | H04L 7/0334 |
| 10,447,350 | B2* | 10/2019 | Leow | H04L 7/08 |
| 10,484,215 | B2* | 11/2019 | Wicaksana | H04L 27/0014 |
| 10,574,303 | B1* | 2/2020 | Hueber | H04B 5/0075 |
| 10,749,616 | B2* | 8/2020 | Cordier | H04B 17/21 |
| 10,749,719 | B2 | 8/2020 | Houdebine | |
| 10,841,887 | B2* | 11/2020 | Houdebine | H04B 5/0075 |
| 2016/0294541 | A1* | 10/2016 | van de Beek | H03L 7/23 |

FOREIGN PATENT DOCUMENTS

| | | |
|---|---|---|
| EP | 3429087 A1 | 1/2019 |
| FR | 3077174 A1 | 7/2019 |

OTHER PUBLICATIONS

Sai, Akihide et al., "A Digitally Stabilized Type-III PLL Using Ring VCO with 1.01psrms Integrated Jitter in 65nm CMOS", ISSCC 2012/Session 14/ Digital Clocking & PLLs/14.5, IEEE International Solid-State Circuits Conference, Feb. 21, 2012, 3 pages.

Goubin, L., "A Sound Method for Switching Between Boolean and Arithmetic Masking," Cryptographic Hardware and Embedded Systems, 13 pages, XP008002644.

* cited by examiner

Figure 8

NFC DEVICE EMULATED IN CARD MODE COMPRISING A DIGITAL PHASE LOCKED LOOP, AND CORRESPONDING COMMUNICATION METHOD

CROSS-REFERENCE TO RELATED APPLICATIONS

This application claims the benefit of French Application No. 1912076, filed on Oct. 28, 2019, which application is hereby incorporated herein by reference.

TECHNICAL FIELD

Modes of implementation and embodiments of the invention relate to contactless communications, in particular near-field communication "NFC", near-field communication-type communications, and in particular devices in card emulation mode communicating through active load modulation "ALM", and corresponding methods.

BACKGROUND

NFC technology is an open technological platform that has been standardized in the ISO/IEC 18092 and ISO/IEC 21481 standards, but incorporates numerous standards that already exist, such as for example the Type A and Type B protocols defined in the ISO-14443 standard, which may be communication protocols able to be used in NFC technology.

SUMMARY

During a transmission of information between a reader and an object in card or ticket emulation mode, the reader generates a magnetic field via its antenna, which is generally a sinusoidal wave at 13.56 MHz in the standards that are conventionally used. The strength of the magnetic field is between 0.5 and 7.5 amps/metre RMS (root mean square).

Two modes of operation are then possible, a passive mode or an active mode.

In the passive mode, only the reader generates the magnetic field and the object, in card or ticket emulation mode, is passive. The antenna of the object emulating the card then modulates the field generated by the reader so as to change the output impedance of the antenna of the reader through magnetic coupling between the two antennas.

Thus, in this way, the information to be transmitted from the object to the reader is transmitted, through load modulation, to the antenna impedance of the reader.

In the active mode of operation, the reader and the object in card emulation mode both generate an electromagnetic field. Generally, this mode of operation is used when the object is provided with its own power source, for example a battery, as is the case with a cellular mobile telephone, which is then in card emulation mode.

Each of the NFC devices transmits data using a modulation scheme, for example a Manchester or BPSK (binary phase shift keying) modulation scheme.

In this case too, the modulation is reflected by a load modification, and reference is then made to communication through active load modulation ALM.

In comparison with a passive communication mode, greater operating distances are obtained, which may range as far as 20 cm depending on the protocol that is used.

Moreover, the use of active load modulation makes it possible to use very small antennas.

That being said, this type of communication through active load modulation presents other problems.

Specifically, during the active communication periods of the device in card emulation mode, the electromagnetic field of the reader is not directly observable. This may also lead to a non-synchronous response of the object in card emulation mode and therefore to a phase-offset signal received by the reader.

There are techniques for synchronizing the device in card emulation mode and the reader outside of the synchronization periods, such as for example described in the French patent application filed under number 1850428, which apply in particular when the device has a suitable clock.

That being said, the device in card emulation mode does not necessarily have a suitable clock, for example typically in the case of small portable connected objects such as a connected watch. Specifically, the internal clock of this type of device in card emulation mode is typically based on the oscillating frequency of quartz at 32.768 kHz, and this frequency is not enough to effectively lock the phase of a signal at a frequency for example of 13.56 MHz, in particular in terms of noise performance.

When the device in card emulation mode does not have a suitable clock, what is called an intra-frame synchronization mode of operation, for example in accordance with Type A 106 kbps, called "Manchester", of the abovementioned standard, is generally required.

Furthermore, "Manchester" Type A 106 kbps requires leaving the oscillator in free operation for series of 10 µs, this being relatively lengthy, and the phase offset of the oscillator in free operation is significant, to the point that it is difficult to comply with the specifications of the standard in relation to Manchester Type A 106 kbps. The standard in question typically stipulates a phase offset of less than 15° in terms of absolute value for the duration of free operation.

Now, it would be desirable to benefit from NFC devices in card emulation mode at a low cost and while complying with the near-field communication standards, or even to benefit from a margin with respect to the standards.

There is therefore a need to reduce as far as possible or even eliminate the phase offset, in particular when the oscillators operate freely in "Manchester" Type A 106 kbps of the standard in relation to NFC communication, easily, reliably and inexpensively.

In this respect, what is proposed according to one aspect is a near-field communication "NFC" device using active load modulation, the device being in card emulation mode and intended to communicate with a reader, comprising a digital phase-locked loop or frequency-locked loop configured so as to generate a clock signal, having an oscillator configured so as to generate the clock signal in a manner controlled by an analog control signal, a feedback circuit configured so as to generate a digital control signal, a digital-to-analog converter configured so as to convert the digital control signal into the analog control signal, and an integrator assembly configured so as to integrate the analog control signal.

Specifically, the phase offset of conventional oscillators in free operation is influenced in particular by the phase noise of the oscillator, the linearity of the control signal of the oscillator, the noise of the control elements of the oscillators, such as continually active bias current sources, or resistive components.

Now, the integrator assembly makes it possible in particular to integrate the DC component of the analog control signal of the oscillator, and this makes it possible to "center" the digital control signal "on 0" through the effect of the feedback circuit. That is to say, the digital-to-analog converter does not need to deliver an analog control signal comprising the DC component of the control of the oscillator.

The DC bias currents conventionally generated in order to control the DC component of the digital control signal in the oscillator are thus not necessary, and the device is freed from the noise resulting from bias current sources that are conventionally continually active.

Furthermore, only the variations in the digital control signal are able to be converted into the analog control signal. Thus, given that the signal at the input of the converter is "centered on 0", the variations in the analog control signal benefit from identical linearity regardless of the level of the analog control signal.

Moreover, the use of an analog integrator assembly simplifies the design of the digital-to-analog converter in comparison with conventional techniques using a digital integrator. Specifically, the digital-to-analog converter may for example comprise a simple charge pump, the output charges from the digital-to-analog converter being converted into a voltage by the integrator, comprising for example a capacitor.

According to one embodiment, the feedback circuit is configured so as to generate the coded digital control signal using thermometric coding for the digital-to-analog converter.

The thermometric coding makes it possible to linearize the digital control of the digital-to-analog converter. Specifically, thermometric coding, in which the coding is performed by adding transistors of identical weights, is not subject to the risk of a variation in the granularity of the binary coding operations caused by a disparity between a transistor of high weight with respect to the sum of the transistors of low weights.

Thermometric coding conventionally has the drawback of requiring a greater number of transistors than binary coding, for the same dynamic range and the same accuracy. That being the, due to the fact that only the variations in the digital control signal are able to be converted into the analog control signal in the device according to this aspect, it is not necessary to cover the entire dynamic range of the analog control in the coding. It is thus possible to benefit from the same accuracy in thermometric coding as in binary coding without increasing the size of the converter.

In summary, this embodiment makes it possible to benefit from better linearity without increasing the size of the converter or worsening its accuracy. Given that the linearity of the control signal of the oscillator is improved, the phase offset during free operation of the oscillators is also improved.

According to one embodiment, the feedback circuit is configured so as to generate the digital control signal so as to compensate a phase offset or frequency offset in the clock signal with respect to a reference signal, and comprises a digital filter in order to stabilize the digital control signal, the digital filter having unity gain at zero frequency.

Thus, unlike normal filters of phase-locked loops, typically consisting of an integrator in order to cancel out the phase error and a stabilizing zero and a pole for optimizing noise filtering, the digital filter may have unity gain at zero frequency, that is to say comprising for example just a zero and a pole and without an integrator, given that a static error in the compensation of the phase offset will be cancelled out by the integrator assembly.

According to one embodiment, the integrator assembly comprises a capacitive element configured so as to accumulate charge resulting in a voltage able to control the oscillator, possibly accompanied by a low-pass filter.

According to one embodiment, the digital-to-analog converter is configured so as to generate the analog control signal comprising a variable-strength current whose strength is controlled by the digital control signal for a fixed duration.

For example, the digital-to-analog converter is advantageously configured so as to generate the variable-strength current comprising a first negative-strength current for a first half of the fixed duration, and a second positive-strength current for a second half of the fixed duration.

Systematically generating a positive current pulse and a negative current pulse for a fixed duration in particular makes it possible to reduce fractional interference and avoids introducing a signature of a current generator into the integrator, and this also makes it possible to ensure better linearity of the digital-to-analog converter.

According to another embodiment, the digital-to-analog converter is configured so as to generate the analog control signal comprising a fixed-strength current for a variable duration that is controlled by the digital control signal.

For example, the digital-to-analog converter is advantageously configured so as to generate the fixed-strength current comprising a first fixed negative-strength current for a first variable duration that is controlled by the digital control signal, and a second fixed positive-strength current for a second variable duration that is controlled by the digital control signal.

Likewise, systematically generating a positive current pulse and a negative current pulse in particular makes it possible to avoid introducing a signature of a current generator into the integrator.

The fixed duration or the variable duration may advantageously be measured based on the frequency of the clock signal.

According to another embodiment, the digital-to-analog converter is configured so as to cyclically charge an intermediate capacitive element to a variable pre-charging voltage that is controlled by the digital control signal, and to switch the intermediate capacitive element charged to the pre-charging voltage on the integrator.

In this example, the integrator assembly is thus configured so as to integrate a voltage signal at the output of the digital-to-analog converter into an integrated voltage signal, that is to say the analog control signal, the integrator assembly possibly also having a capacitor for this purpose.

A device as defined above may advantageously comprise a transmission stage configured so as to modulate a subcarrier signal extracted from the clock signal, so as to communicate in accordance with the NFC Type A 106 kbps protocol with intra-frame synchronization.

According to another aspect, what is proposed is a near-field communication "NFC" method using active load modulation, comprising, within a device in card emulation mode communicating with a reader, generating a clock signal controlled by an analog control signal, feedback comprising generating a digital control signal, a digital-to-analog conversion comprising converting the digital control signal into the analog control signal, and integrating the analog control signal.

According to one mode of implementation, the digital control signal is coded using thermometric coding for the digital-to-analog conversion.

According to one mode of implementation, the feedback comprises generating the digital control signal so as to compensate a phase offset or frequency offset in the clock signal with respect to a reference signal, and comprises stabilizing the digital control signal using a digital filter having unity gain at zero frequency.

According to one mode of implementation, the integration comprises accumulating charge resulting in a voltage able to control the generation of the clock signal, and possibly low-pass filtering of the variation in the charge to be accumulated.

According to one mode of implementation, the digital-to-analog conversion comprises generating the analog control signal comprising a variable-strength current whose strength is controlled by the digital control signal for a fixed duration.

For example, the variable-strength current advantageously comprises a first negative-strength current for a first half of the fixed duration, and a second positive-strength current for a second half of the fixed duration.

According to another mode of implementation, the digital-to-analog conversion comprises generating the analog control signal comprising a fixed-strength current for a variable duration that is controlled by the digital control signal.

For example, the fixed-strength current advantageously comprises a first fixed negative-strength current for a first variable duration that is controlled by the digital control signal, and a second fixed positive-strength current for a second variable duration that is controlled by the digital control signal.

The fixed duration or the variable duration may advantageously be established based on the frequency of the clock carrier signal.

According to another mode of implementation, the digital-to-analog conversion comprises cyclically charging an intermediate capacitive element to a variable pre-charging voltage that is controlled by the digital control signal, and switching the intermediate capacitive element charged to the pre-charging voltage in order to integrate the analog control signal.

The method as defined above may furthermore comprise modulating a subcarrier signal extracted from the clock signal, so as to communicate in accordance with the NFC Type A 106 kbps protocol with intra-frame synchronization.

BRIEF DESCRIPTION OF THE DRAWINGS

Other advantages and features of the invention will become apparent on examining the detailed description of completely nonlimiting embodiments and modes of implementation, and the appended drawings, in which.

DETAILED DESCRIPTION OF ILLUSTRATIVE EMBODIMENTS

Figure 1:
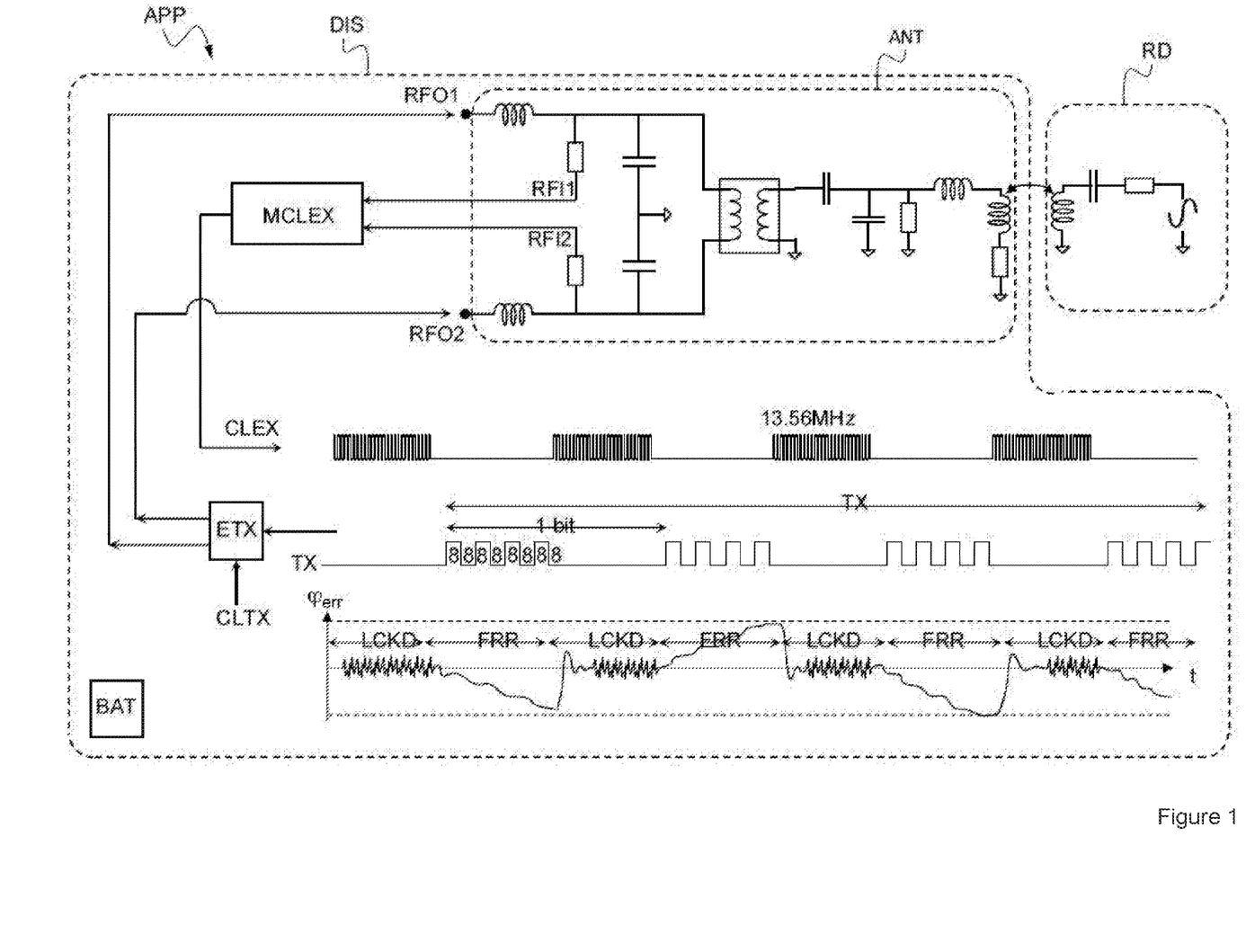
FIG. 1 illustrates a device in card emulation mode for NFC-type contactless communication with a reader RD.

FIG. 1 shows a device DIS in card emulation mode for "NFC" near-field communication-type contactless communication with a reader RD.

The device DIS has an antenna stage ANT capable of communicating with a reader RD in accordance with the NFC contactless communication standards. The antenna stage ANT has a conventional structure that is known per se and will not be described here.

The device DIS may be incorporated into an electronic appliance APP, for example a small portable connected object such as a connected watch. The appliance APP typically has its own power supply BAT, typically a battery, and a clock platform, typically based on the oscillation of quartz at 32.768 kHz.

The clock platform of the connected object appliance APP is typically not fast and accurate enough to perform synchronization operations on the signals of the NFC contactless communication; in particular, such a clock does not make it possible to correctly filter the noise of the oscillator or to have a fast enough reaction time for a phase-locked loop, for example as described below with reference to FIG. 2.

For example, the device DIS is configured so as to communicate in accordance with the "Manchester" NFC Type A protocol with what is called "intra-frame" synchronization.

The device DIS is thus capable of extracting an extracted clock signal CLEX from a reference clock signal communicated by the reader RD, via a read path $RFI_1$, $RFI_2$ of the antenna ANT, and clock extraction means MCLEX.

The extracted clock signal CLEX is a reference signal for the device DIS, for example at a frequency of 13.56 MHz as provided by the standards of the NFC protocol.

The device DIS comprises a transmission stage ETX configured so as to transmit "1-bit" data frames TX to the reader RD, on a transmission path $RFO_1$, $RFO_2$ of the antenna ANT.

In accordance with what is called the "Manchester" Type A 106 kbps NFC protocol, each frame contains signal bursts generated for example from a subcarrier CLTX at 13.56 MHz, in a 106 kHz modulation scheme.

As will become apparent below with reference to FIGS. 2 to 10, the device DIS has a phase-locked loop DPLL in order to generate the signal of the subcarrier at 13.56 MHz.

The device may possibly have a frequency-locked loop in order to generate the signal of the subcarrier at 13.56 MHz. For example, the frequency-locked loop may be integrated into the phase-locked loop DPLL as described in the French patent application filed under number 1850428.

During the transmission TX of the bursts of a frame, transmission phases FRR and locked phases LCKD are alternated between using what is called intra-frame synchronization.

During a locked phase LCKD, the device does not transmit any signal on the transmission path $RFO_1$, $RFO_2$, and the clock signal CLEX of the reader RD is able to be recovered on the reception path $RFI_1$, $RFI_2$. The phase-locked loop is locked to the extracted clock signal CLEX so as to have an adjustable phase offset φerr of 0 to 360° in order to optimize communication with the reader RD.

During a phase of transmitting a burst FRR, the modulated subcarrier is communicated on the transmission path $RFO_1$, $RFO_2$ of the antenna ANT. The electromagnetic field of the reader RD is not directly observable during the transmission FRR, and the clock extraction means MCLEX stop delivering the extracted clock signal CLEX The phase-locked loop is in what is called a free operating state FRR during the transmission phase. A drift in the phase error φerr may also be observed during the free operating state FRR.

That being said, as will become apparent below with reference to FIGS. 2 to 8, means advantageously make it possible to limit the drift in the phase error φerr so as to be perfectly within the interval permitted by the NFC standards, for example between −15° and +15°.

Figure 2:
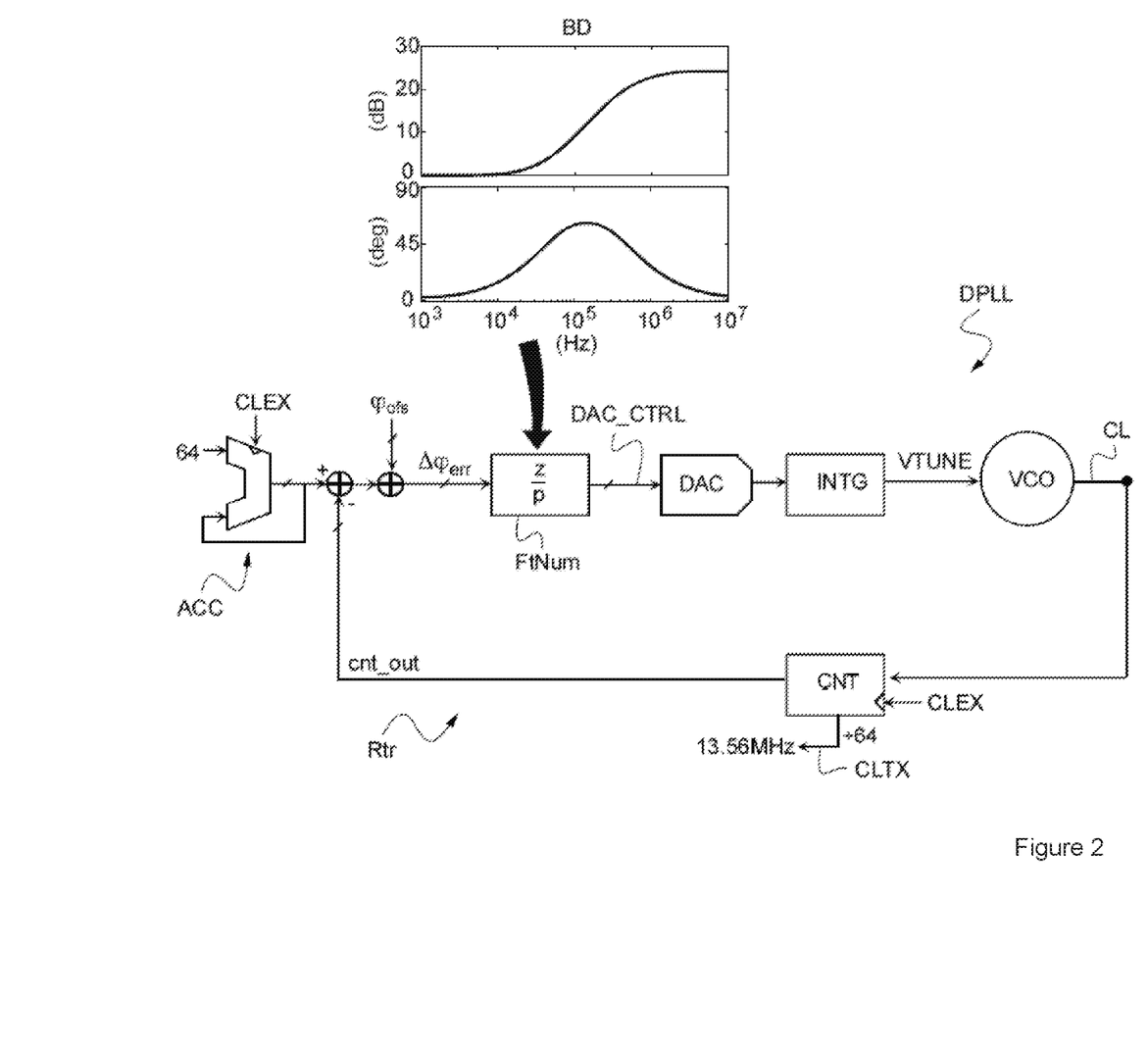
FIG. 2 illustrates an example of the digital phase-locked loop of the device illustrated in FIG. 1.

FIG. 2 illustrates an example of the digital phase-locked loop DPLL of the device DIS described above with reference to FIG. 1, capable of generating the subcarrier CLTX at 13.56 MHz and having very limited phase drift during free operation.

The digital phase-locked loop DPLL has a voltage-controlled oscillator VCO in order to generate a digital clock signal CL, oscillating with an alternation of high and low levels at a frequency that is controlled by an analog voltage control signal VTUNE.

The frequency of the subcarrier CLTX in this example has to be at 13.56 MHz, but the oscillator VCO is configured so as to generate the clock signal CL at a frequency chosen to be equal to N*13.56 MHz, where for example N=64.

The phase-locked loop DPLL has a feedback circuit Rtr configured so as to generate a digital control signal DAC_CTRL so as to slave the analog control VTUNE of the oscillator VCO.

The feedback circuit Rtr is in particular advantageously configured so as to generate the digital control signal DAC_CTRL in order to compensate a phase offset Δφerr in the clock signal CL with respect to the reference signal CLEX (and/or a frequency offset in the case of a frequency-locked loop).

In this respect, the feedback circuit Rtr in particular has a counter CNT and an accumulator ACC.

The counter CNT is configured so as to count the cycles of the clock signal CL, so as to provide an output word cnt_out representative of the count, for example coded in binary. Coded in binary is understood within the conventional meaning, known per se, of increasing by powers of 2. Triggering the reference signal CLEX, when this is available, makes it possible to enter the current value of the count into the output word cnt_out.

In other words, the output word cnt_out represents a number equal to k*N+Err, where N is the coefficient of the oscillator, for example N=64, k is the number of instances of the reference signal CLEX since the start of the transmission and Err is an error possibly resulting from a phase offset (or frequency offset) in the clock signal CL with respect to the reference signal CLEX, taking into account the factor N.

The counter CNT also has a divider for dividing by N, for example by 64, in order to provide the subcarrier signal CLTX at the desired frequency, for example 13.56 MHz, from the clock signal CL, for example at 64*13.56 MHz.

The accumulator ACC for its part counts an accumulation of N, that is to say k*N, where N=64 for example, and k is the number of instances of the reference signal CLEX without an error.

The output of the counter CNT is fed back to the output of the accumulator ACC by way of a first adder.

In the remainder of the text and using terms commonly used by those skilled in the art, the term "adder" incorporates the function "summing" or the function "subtraction" depending on the + or − signs appearing at the inputs of the adder.

The first adder is configured so as to subtract the value of the count coded on the output word cnt_out of the counter CNT from the value of the accumulation counted by the accumulator ACC.

The digital control signal at the output of the first adder Δφerr, for example a digital word coded in binary on 8 bits, is thus representative of a compensation of the abovementioned error term Err.

Moreover, optionally, a second adder makes it possible to add a phase offset φofs at the output of the first adder, for example configured in the factory so as to compensate a phase offset caused by the means positioned between the antenna ANT and the phase-locked loop DPLL.

The feedback circuit Rtr may furthermore have a digital filter FtNum configured so as to stabilize the digital control signal Δφerr into a stable digital control signal DAC_CTRL. The filter FtNum is advantageously defined by a zero and a pole "z/p". The transfer function of the digital filter FtNum advantageously has unity gain, that is to say equal to 1, i.e. 0 dB, at zero frequency.

One example of the transfer function of the filter FtNum is illustrated by a Bode plot BD. It may possibly be considered that the Bode plot BD represents the transfer function of the pair comprising the digital filter FtNum and the converter DAC.

The digital control signal DAC_CTRL is thus generated in order to control the oscillator VCO in a manner slaved with respect to the reference signal CLEX when this is available, that is to say during the locked phases LCKD of the transmission (FIG. 1).

Slaving by way of the feedback circuit Rtr, for example as described above, makes it possible to lock the clock signal CL generated by the oscillator VCO in terms of phase and/or in terms of frequency to the reference signal CLEX during the locked phases LCKD, this being advantageously per se.

That being said, during the transmission phases FRR, when the oscillator VCO is in free operation, that is to say without the feedback from the feedback circuit, and therefore for an inactive digital control signal DAC_CTRL, for example at "0" by default, a phase drift (possibly a frequency drift in the case of a frequency-locked loop) may occur.

The digital phase-locked loop DPLL for this purpose has means for converting the control signal of the oscillator in order to considerably reduce the phase drift (or frequency drift) during free operation FRR.

Specifically, the digital phase-locked loop DPLL has a digital-to-analog converter DAC and an integrator assembly INTG that are configured so as to convert and integrate the digital control signal DAC_CTRL into an analog control signal VTUNE that controls the oscillator VCO.

The integrator assembly INTG is configured in particular so as to integrate the DC component of the analog control signal at the output of the digital-to-analog converter DAC, for example by accumulating charge resulting in the analog control voltage VTUNE. The integrator assembly INTG may for this purpose have a capacitive element such as a capacitor, and possibly other active elements such as amplifiers.

As an alternative, the integrator assembly may be configured so as to integrate the DC component of the signal at the output of the converter DAC by integrating a voltage resulting in the analog control voltage VTUNE, and likewise have a capacitor and possibly other active elements for this purpose.

The output of the converter DAC is thus centered on the level of the integrated analog control signal VTUNE.

As a result, the digital-to-analog converter DAC and its digital control DAC_CTRL are configured so as not to generate the DC component of the analog control voltage VTUNE.

The DC bias currents conventionally generated in order to control the DC component of the control signal of the oscillator thus do not need to be generated, and the phase noise coming from continually active bias current sources is not an issue.

The integrator assembly INTG therefore makes it possible to eliminate phase noise resulting from DC current sources, and thus to limit the contributions of noise adding to the phase noise of the oscillator circuit VCO and responsible for phase drift during free operation.

In summary, the analog control operation VTUNE of the oscillator VCO of the phase-locked loop DPLL described with reference to FIG. 2 may lead to a phase drift during free operation that is far smaller (for example at least 50%) than the drift of conventional control operations, for example typically of the order of 25 deg.

Figure 3:
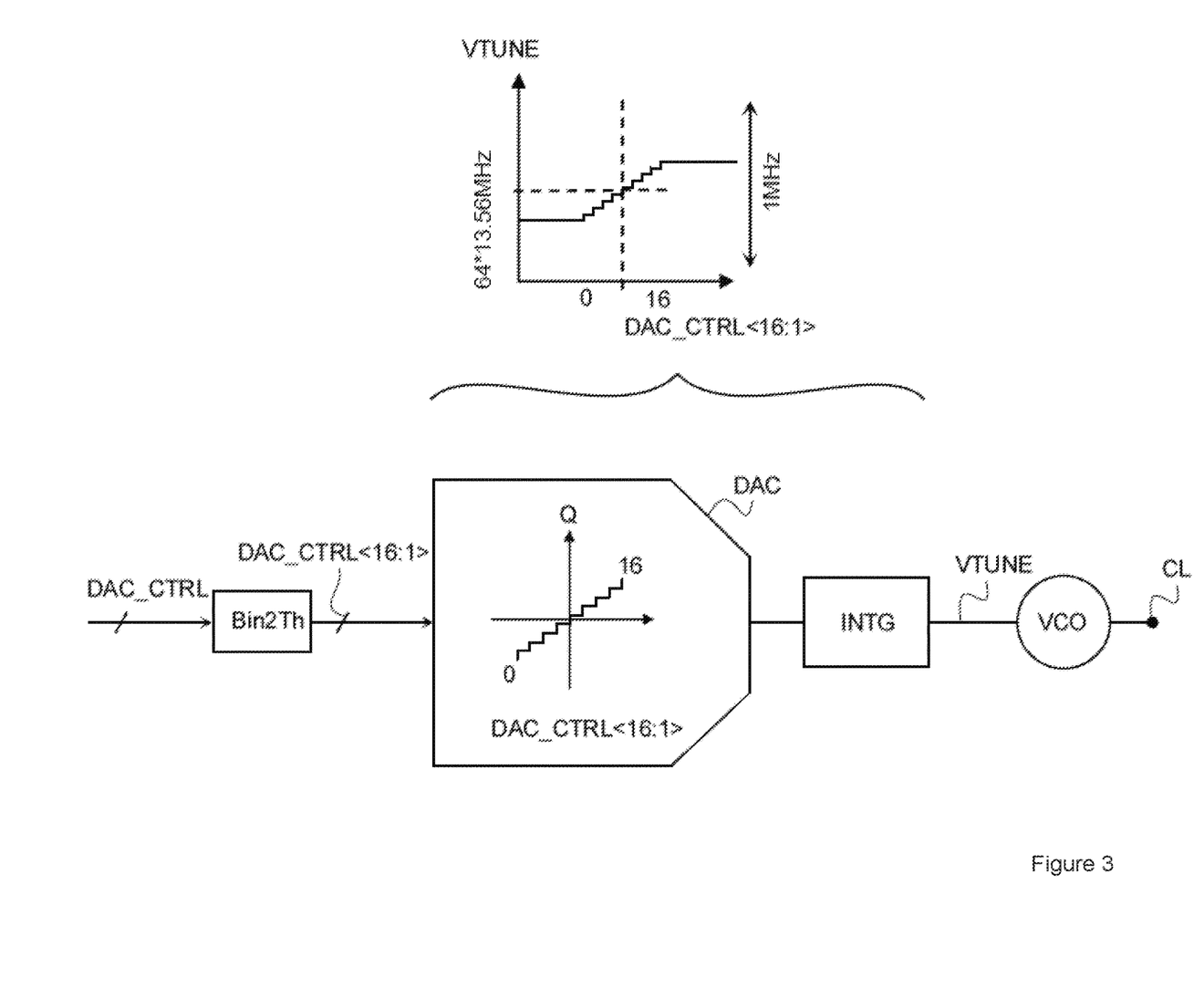
FIG. 3 illustrates an embodiment generating an analog control signal by integrating the output of a digital-to-analog converter.

FIG. 3 shows one embodiment advantageously utilizing the property of generating the analog control signal VTUNE by integrating the output of the digital-to-analog converter DAC.

Given that only the variations in the digital control signal DAC_CTRL are converted into the analog control signal VTUNE, the variations in the analog control signal benefit from the same linearity regardless of the level of the analog control signal VTUNE, on the one hand; and it is not necessary to cover the entire dynamic range of the analog control operation in the coding at the input of the converter DAC, on the other hand.

The dynamic range of the coding, that is to say the interval of the analog control voltage VTUNE of the oscillator, is typically intended to cover the granularity in the calibres of the oscillator VCO, for example 1 MHz.

Thus, in conventional cases not comprising the integrator INTG at the output of the converter DAC, the coding is typically provided in binary code since the digital signal at the input of the DAC has to cover the entire frequency band of the calibre (for example 1 MHz), thereby increasing the number of bits thereof for benefiting from a fine granularity. The granularity is also called pitch, or else quantification pitch.

Digital-to-analog converters using binary coding are generally subject to linearity faults, and even a risk of negative variation in a quantification pitch, caused by a risk of a disparity (that is to say a matching fault) between a transistor of high weight with respect to the sum of the transistors of lower weight.

Now, in the phase-locked loop DPLL described above with reference to FIG. 2, since it is not necessary to cover the entire dynamic range of the analog control operation in the coding at the input of the converter DAC, it is possible to use thermometric coding.

In contrast to binary coding, thermometric coding is defined by a sum of unity elements, a sum of 1, the sum being converted into analog through an accumulation of transistors of identical weights.

Specifically, thermometric coding has fewer linearity defects but a greater number of transistors than binary coding, in a manner that is conventional and known per se.

Of course, using binary coding is entirely compatible with the digital-to-analog converter DAC presented here.

Thus, according to one exemplary embodiment, the feedback circuit Rtr (FIG. 2) is configured so as to generate the coded digital control signal DAC_CTRL<16:1> using thermometric coding for the digital-to-analog converter DAC. For example, the feedback circuit Rtr has a binary-to-thermometric converter Bin2Th configured so as to convert the binary code of the digital control signal DAC_CTRL into a thermometric digital control signal DAC_CTRL<16:1> in order to control the converter DAC.

Thus, due to the fact that, in this embodiment, only the variations in the digital control signal are converted into the analog control signal, it is possible to benefit from the same accuracy in thermometric coding as in binary coding without increasing the size of the converter, while at the same time improving the linearity of the output analog signal VTUNE.

Due to the lower quantification error, using a thermometrically coded digital control signal makes it possible to reduce phase drift during free operation.

Figure 4:
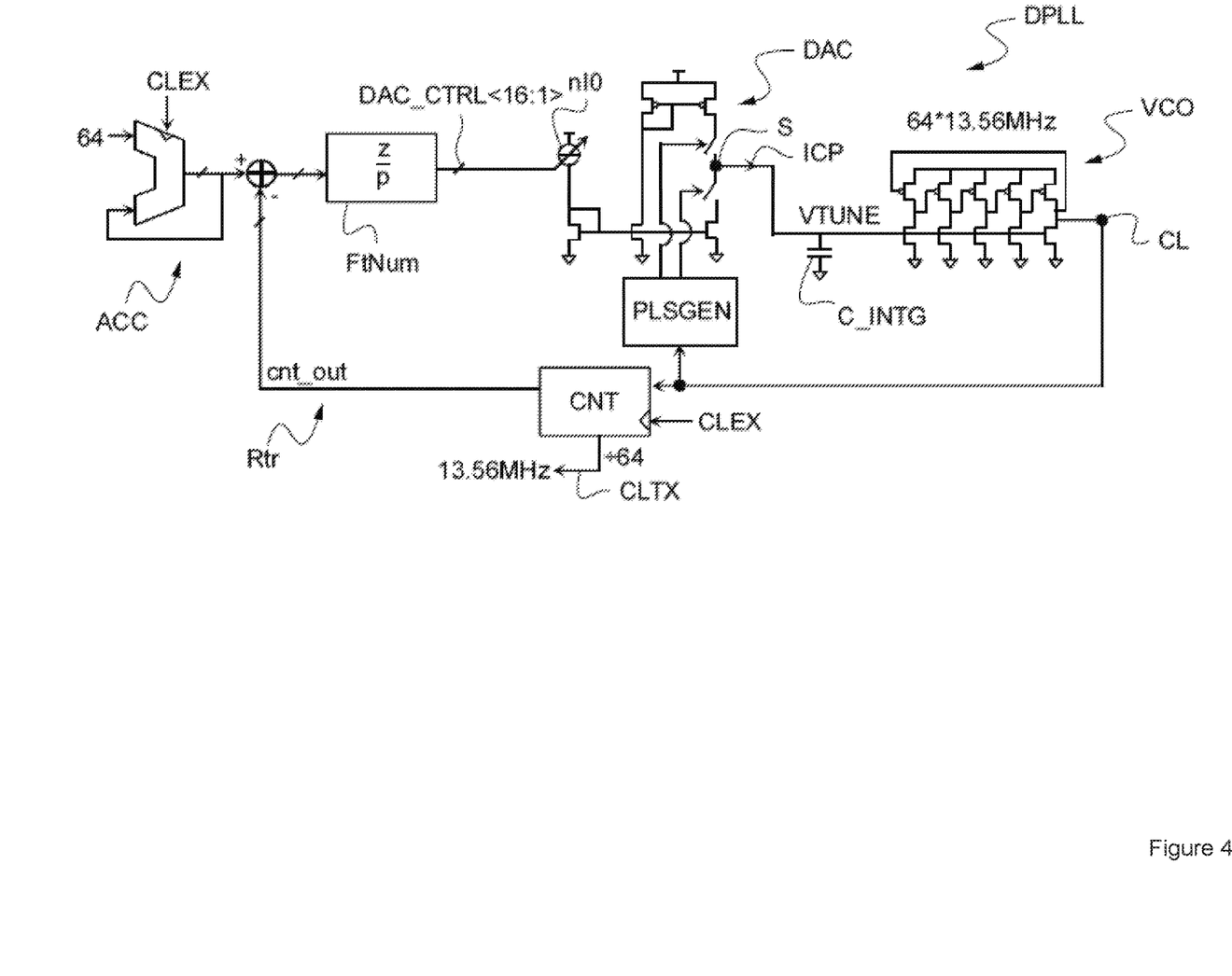
FIG. 4 illustrates an exemplary embodiment of the phase-locked loop illustrated in FIG. 2.

FIG. 4 shows an exemplary embodiment of the phase-locked loop DPLL as described above with reference to FIGS. 2 and 3; common elements have the same references and will not be described again here.

The oscillator VCO is shown in the manner of a digital ring oscillator that is known per se, and is configured so as to generate a clock signal CL that oscillates between two "high" and "low" levels, or else "1" and "0", at a chosen frequency of 64*13.56 MHz.

The integrator assembly in this example has a capacitive element C_INTG, coupled between the output of the digital-to-analog converter DAC and a reference voltage terminal, for example ground.

The capacitive element C_INTG is thus configured so as to accumulate charge, coming from the converter DAC, resulting in a voltage VTUNE intended to control the oscillator VCO.

The binary-to-thermometric converter Bin2Th, as described for example above with reference to FIG. 3, is incorporated into the digital filter block FtNum of the feedback circuit Rtr, and is not shown.

In this embodiment, the digital-to-analog converter DAC is configured so as to generate the analog control signal VTUNE by generating a variable-strength current ICP on an output S linked to the integrator assembly C_INTG. A current generator nI0 is configured so as to generate a current whose strength is controlled by the digital control signal DAC_CTRL<16:1>.

The current generated by the generator nI0 is distributed to the output S of the converter DAC by a set of current mirrors and by way of a set of switches controlled by a pulse generator PLSGEN.

The set of current mirrors has an N-type transistor current mirror assembly coupled to the output S by a first switch, and a P-type transistor current mirror assembly coupled to the output S by a second switch.

The N-type current mirror assembly makes it possible to draw the current generated by the generator nI0 on the output S for a fixed duration upon the command of the first switch by the pulse generator PLSGEN.

This makes it possible to generate a current ICP with a negative sign and a strength that is controlled by the control signal DAC_CTRL<16:1>, on the output S.

The P-type current mirror assembly makes it possible to consume the current generated by the generator nI0 on the output S for a fixed duration upon the command of the second switch by the pulse generator PLSGEN.

This makes it possible to generate a current ICP with a positive sign and a strength that is controlled by the control signal DAC_CTRL<16:1>, on the output S.

The analog control signal VTUNE is then generated either by injecting a current ICP into the integrator C_INTG over a duration defined by PLSGEN, or by drawing the current ICP from the integrator C_INTG over a duration defined by PLSGEN, or in the absence of current ICP if the feedback circuit Rtr does not modify the frequency of the oscillator VCO as its phase error is zero.

Figure 5:
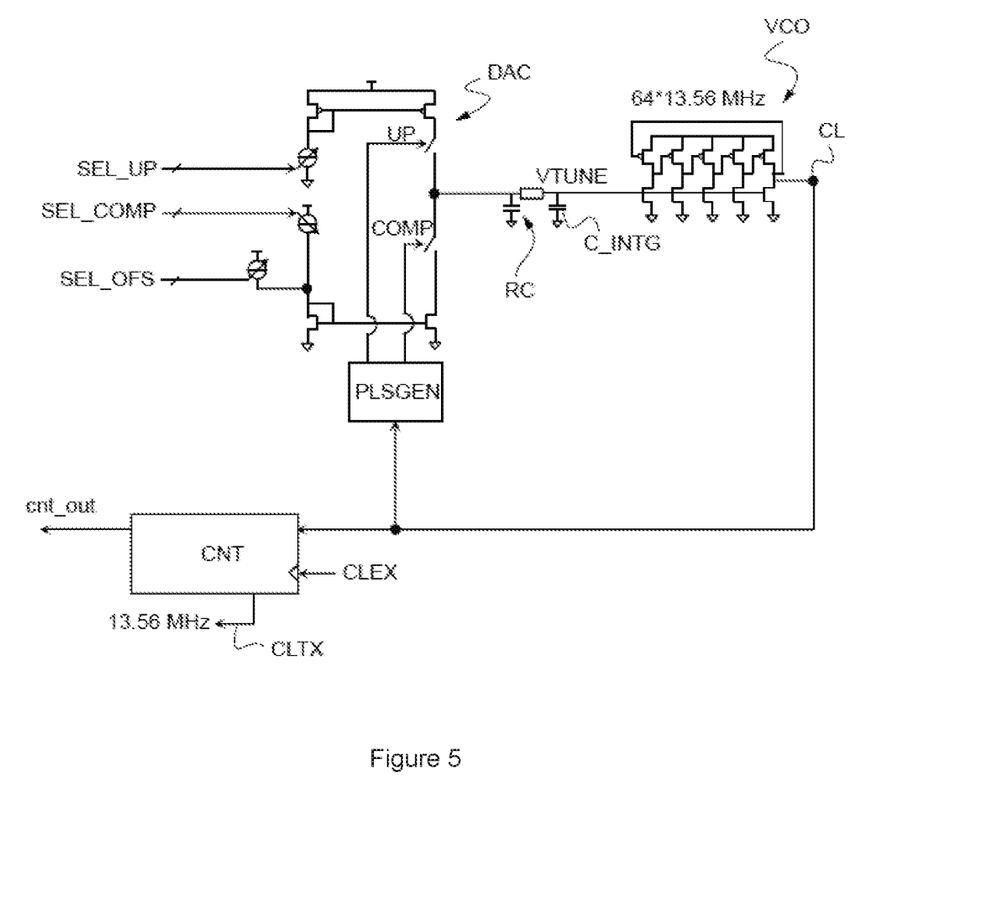
FIG. 5 illustrates an example of the digital-to-analog converter illustrated in FIG. 4.
Figure 6:
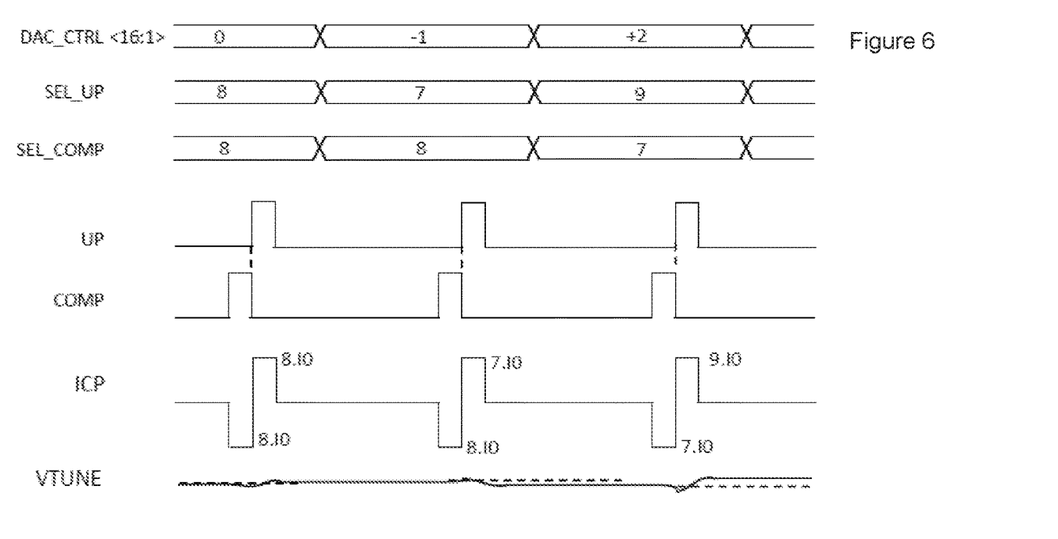
FIG. 6 illustrates an exemplary implementation of the generation of the incoming and outgoing signals in the exemplary converter of FIG. 5.

Reference is made to FIGS. 5 and 6, which will both be described together; the references in common with FIG. 4 denote the same elements and these will not all be described again here.

FIG. 5 illustrates an advantageous example of the digital-to-analog converter DAC described above with reference to FIG. 4.

FIG. 6 illustrates an exemplary implementation of the generation of the incoming and outgoing signals in the exemplary converter DAC of FIG. 5.

In this example, the digital control signal DAC_CTRL<16:1> is transformed into a positive control signal SEL_UP, a negative control signal SEL_COMP, and optionally a third adjustment control signal SEL_OFS.

The positive control signal SEL_UP controls the strength of what is called a positive current generated by a first current source interacting with the P-type current mirror assembly.

The negative control signal SEL_COMP controls the strength of what is called a negative current generated by a second current source interacting with the N-type current mirror assembly.

The optional adjustment control signal SEL_OFS may serve to control another current source adding or taking away a current differential to or from what is called the negative current in order to balance any inequality between the positive and negative currents flowing into the respective current mirror assemblies. For example, the value of the adjustment control signal SEL_OFS may be set automatically by the feedback circuit Rtr, for example in order to put the converter DAC in its optimum operating area and prevent any side effects linked to the implementation of the converter DAC. The optimum operating area of the converter DAC may be known to the feedback circuit Rtr by virtue of the control operations SEL_UP and SEL_COMP in the established state.

The pulse generator PLSGEN is configured so as to generate what is called a negative digital pulse COMP that controls the first switch so as to electrically connect the output S to the output of the N-type transistor current mirror assembly. Thus, during the duration of the negative pulse COMP, the negative-strength current controlled by the negative control signal SEL_COMP is generated on the output S.

The pulse generator PLSGEN is configured so as to generate what is called a positive digital pulse UP that controls the second switch so as to electrically connect the output S to the output of the P-type transistor current mirror assembly. Thus, during the duration of the positive pulse UP, the positive-strength current controlled by the positive control signal SEL_UP is generated on the output S.

Advantageously, the pulse generator PLSGEN is configured so as to generate the positive pulse UP and the negative pulse COMP immediately after one another. The positive pulses UP and COMP have the same duration and each represent half a fixed duration.

In other words, the digital-to-analog converter DAC may be configured so as to generate the variable-strength current ICP comprising a first negative-strength current for a first half COMP of the fixed duration and a second positive-strength current for a second half UP of the fixed duration.

The negative-strength current and the positive-strength current are controlled by the negative control signal SEL_COMP and respectively by the positive control signal SEL_UP, such that the sum of the charges injected into the integrator INTG corresponds to the value DAC_CTRL defined by the feedback circuit Rtr.

Thus, for example if the digital control signal DAC_CTRL<16:1> controls a reduction in the control voltage VTUNE by a thermometric pitch "−1", the negative control signal SEL_COMP may be chosen to be equal to 8 in order to generate a negative-strength current of amplitude 8*I0 (where I0 is a unity appropriate current strength) during the negative pulse COMP; and the positive control signal SEL_UP may be chosen to be equal to 7 in order to generate a negative-strength current of amplitude 7*I0 during the positive pulse UP.

The analog voltage control signal VTUNE resulting from integrating the currents of strength −8*I0 and +7*I0 has a negative variation of one quantification pitch.

Similarly, for a digital control signal DAC_CTRL<16:1> controlling an increase of +2, the integration of the differential of the negative current −7.I0 and positive current +9.I0 by the integrator assembly results in an increase in the control signal VTUNE by two quantification pitches.

In contrast to using a current that is either positive or negative, each one configured so as to be equal to the controlled value, the use of a negative current followed automatically by a positive current, the differential of which is configured so as to be equal to the controlled value, makes it possible not to introduce a signature of the device that generates the currents that would be integrated by the integrator assembly as the adjustments take place. Furthermore, this makes it possible to benefit from finer granularity in the converter DAC, depending on the chosen unity current value I0, and this also ensures improved linearity of the digital-to-analog converter DAC.

The pulse generator PLSGEN may for example use the frequency of the clock signal CL generated by the oscillator VCO, the period or half-period of which is known by virtue of the slaving of the loop DPLL, as time base in order to control the duration of the pulses UP and COMP. The reference signal CLEX may also condition the generation of the pulses, for example by way of circuitry containing logic gates and flip-flops of a conventional design.

Moreover, in this example, the integrator assembly C_INTG is accompanied by a low-pass filter RC intended to filter the variation in the charges to be integrated.

Figure 7:
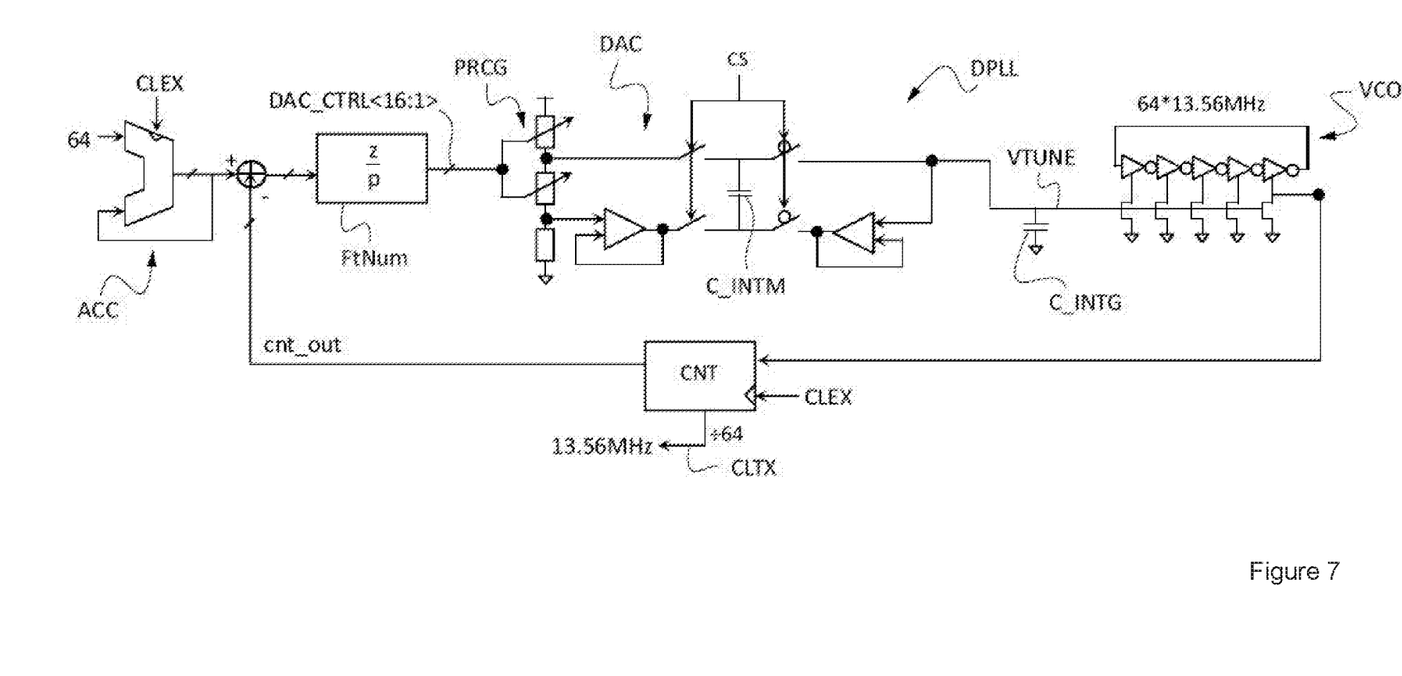
FIG. 7 illustrates another embodiment of the digital-to-analog converter, having a switched capacitor device.

FIG. 7 illustrates another embodiment of the digital-to-analog converter DAC, having a switched capacitor device C_INTM.

A pre-charging stage PRCG is configured so as to charge an intermediate capacitor C_INTM, called switched capacitor, to a potential that is controlled by the digital control signal DAC_CTRL<16:1>.

For example, the pre-charging stage PRCG has a resistive voltage divider bridge having a controllable series assembly of resistive elements, between a supply voltage terminal and a reference voltage terminal.

The charge of the switched capacitor C_INTM is then transmitted at the output of the converter DAC to the integrator assembly C_INTG by a set of opposing switches controlled by a control signal CS.

Thus, in this embodiment, the digital-to-analog converter DAC is configured so as to cyclically charge the intermediate capacitive element C_INTM to a variable pre-charging voltage PRCG that is controlled by the digital control signal DAC_CTRL<16:1>, and to switch the intermediate capacitive element C_INTM charged to the pre-charging voltage on the integrator C_INTG.

The granularity of the DAC will be finer the greater the ratio between the capacitors C_INTG and C_INTM.

Figure 8:
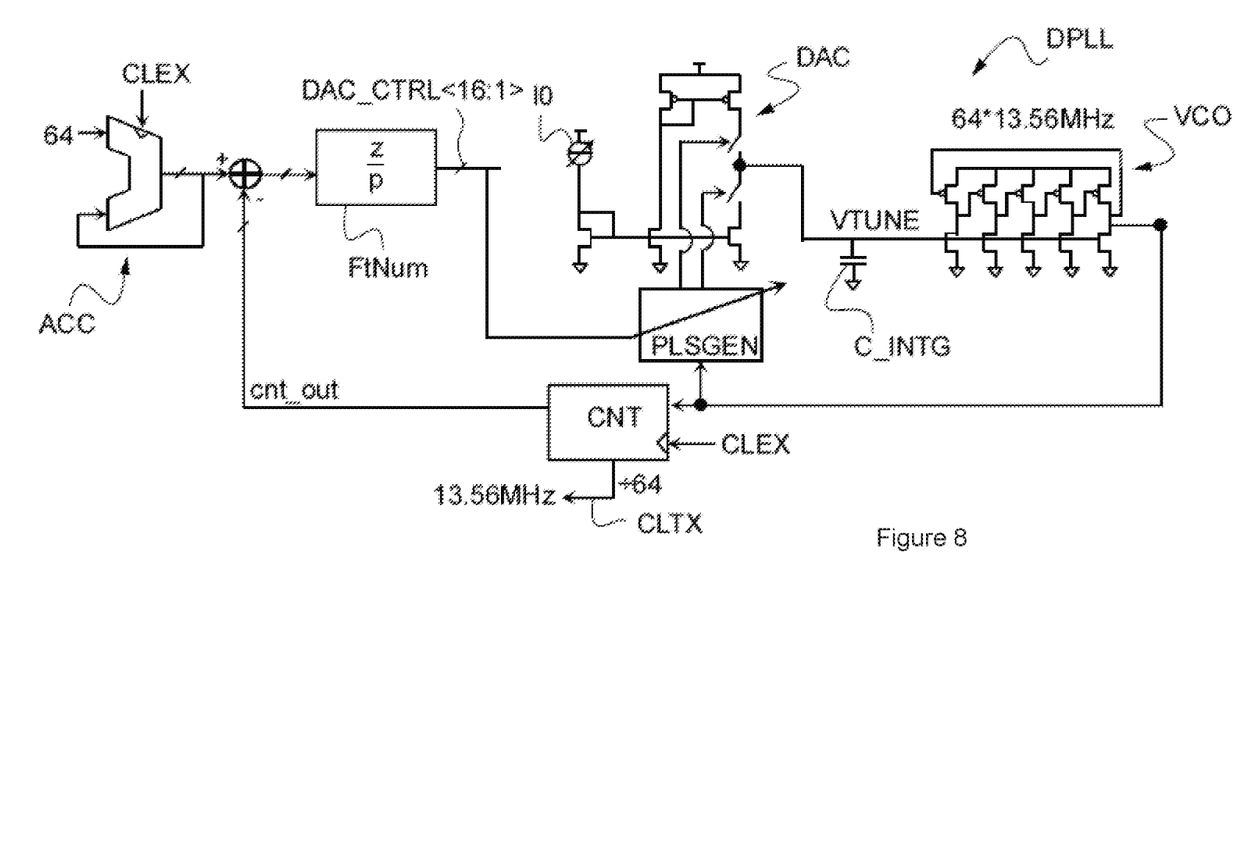
FIG. 8 illustrates another embodiment of the digital-to-analog converter.

FIG. 8 illustrates another embodiment of the digital-to-analog converter DAC.

This embodiment is similar to the embodiment described above with reference to FIGS. 4, 5 and 6, with the difference that the digital-to-analog converter DAC is configured so as to generate a fixed-strength current I0 but for a variable duration that is controlled by the digital control signal DAC_CTRL<16:1>.

The digital control signal DAC_CTRL<16:1> thus controls the pulse generator PLSGEN.

Thus, in the same way as the implementation for generating the signals described with reference to FIG. 6, the digital-to-analog converter DAC may be configured so as to generate a first fixed negative-strength current for a first variable duration that is controlled by the digital control signal DAC_CTRL<16:1>, and a second fixed positive-strength current for a second variable duration that is controlled by the digital control signal DAC_CTRL<16:1>.

The variable durations may also be established based on the frequency of the clock signal CL, or else any other device with a calibrated or uncalibrated delay.

Embodiments and modes of implementation have been described and advantageously allow the digital phase-locked loop DPLL to be applied in an NFC contactless communication device, in particular in a low-cost NFC device in card emulation mode.

The embodiments and modes of implementation described above in particular make it possible to broadly comply with the requirements in terms of phase drift of the near-field communication standards, in particular during free operation of the oscillators in "Manchester" Type A 106 kbps, in what is called intra-frame synchronization mode, of the standard in relation to NFC communication, easily, reliably and inexpensively.

Moreover, the invention is not limited to these embodiments and modes of implementation, but incorporates all variants thereof, for example, as mentioned above, the invention is perfectly compatible in a frequency-locked loop or a phase-locked loop having a frequency-locked loop, or else the design choices of the phase-locked loop, such as the choices of the counter element CNT and accumulator element ACC, of the digital filter FtNum or of the oscillator, may of course be different while at the same time benefiting from the advantages of the invention.

What is claimed is:

1. A near-field communication ("NFC") device using active load modulation, wherein the NFC device is configured to communicate, in card emulation mode, with a reader, and wherein the device comprises:
   a digital phase-locked loop or frequency-locked loop configured to generate a clock signal, wherein the digital phase-locked loop or frequency-locked loop comprises:
      an oscillator configured to generate the clock signal in accordance with an analog control signal;
      a feedback circuit configured to generate a digital control signal;
      a digital-to-analog converter configured to convert the digital control signal into the analog control signal; and
      an integrator configured to integrate the analog control signal.

2. The device according to claim 1, wherein the feedback circuit is configured to generate the digital control signal using thermometric coding for the digital-to-analog converter.

3. The device according to claim 1, wherein the feedback circuit is configured to generate the digital control signal to compensate a phase offset or frequency offset in the clock signal with respect to a reference signal, wherein the feedback circuit comprises a digital filter in order to stabilize the digital control signal, and wherein the digital filter has unity gain at zero frequency.

4. The device according to claim 1, wherein the integrator comprises a capacitive element configured to accumulate charge resulting in a voltage for controlling the oscillator.

5. The device according to claim 1, wherein the digital-to-analog converter is configured to generate the analog control signal comprising a variable-strength current having a strength that is controlled by the digital control signal for a fixed duration.

6. The device according to claim 5, wherein the digital-to-analog converter is configured to generate the variable-strength current comprising a first negative-strength current for a first half of the fixed duration, and a second positive-strength current for a second half of the fixed duration.

7. The device according to claim 5, wherein the fixed duration is measured based on a frequency of the clock signal.

8. The device according to claim 1, wherein the digital-to-analog converter is configured to generate the analog control signal comprising a fixed-strength current for a variable duration that is controlled by the digital control signal.

9. The device according to claim 8, wherein the digital-to-analog converter is configured to generate the fixed-strength current comprising a first fixed negative-strength current for a first variable duration that is controlled by the digital control signal, and a second fixed positive-strength current for a second variable duration that is controlled by the digital control signal.

10. The device according to claim 8, wherein the variable duration is measured based on a frequency of the clock signal.

11. The device according to claim 1, wherein the digital-to-analog converter is configured to cyclically charge an intermediate capacitive element to a variable pre-charging voltage that is controlled by the digital control signal, and to switch the intermediate capacitive element charged to the pre-charging voltage on the integrator.

12. The device according to claim 1, further comprising a transmission stage configured to modulate a subcarrier signal extracted from the clock signal, and to communicate in accordance with NFC Type A 106 kbps protocol with intra-frame synchronization.

13. A near-field communication ("NFC") method using active load modulation, comprising:
   communicating, by a device in card emulation mode, with a reader;
   generating a clock signal controlled by an analog control signal;
   feeding back a digital control signal;
   performing digital-to-analog conversion comprising converting the digital control signal into the analog control signal; and
   integrating the analog control signal.

14. The method according to claim 13, wherein the digital control signal is coded using thermometric coding for the digital-to-analog conversion.

15. The method according to claim 13, wherein the feeding back the digital control signal comprises generating the digital control signal to compensate a phase offset or frequency offset in the clock signal with respect to a reference signal, and comprises stabilizing the digital control signal by a digital filter having unity gain at zero frequency.

16. The method according to claim 13, wherein the integrating comprises accumulating charge resulting in a voltage configured to control the generating of the clock signal.

17. The method according to claim 13, wherein the performing the digital-to-analog conversion comprises generating the analog control signal comprising a variable-strength current having a strength controlled by the digital control signal for a fixed duration.

18. The method according to claim 17, wherein the variable-strength current comprises a first negative-strength current for a first half of the fixed duration, and a second positive-strength current for a second half of the fixed duration.

19. The method according to claim 17, wherein the fixed duration is measured based on a frequency of the clock signal.

20. The method according to claim 13, wherein the performing the digital-to-analog conversion comprises generating the analog control signal comprising a fixed-strength current for a variable duration that is controlled by the digital control signal.

21. The method according to claim 20, wherein the fixed-strength current comprises a first fixed negative-strength current for a first variable duration that is controlled by the digital control signal, and a second fixed positive-strength current for a second variable duration that is controlled by the digital control signal.

22. The method according to claim 20, wherein the variable duration is measured based on a frequency of the clock signal.

23. The method according to claim 13, wherein the performing the digital-to-analog conversion comprises cyclically charging an intermediate capacitive element to a variable pre-charging voltage that is controlled by the digital control signal, and switching the intermediate capacitive element charged to the pre-charging voltage in order to integrate the analog control signal.

24. The method according to claim 13, further comprising modulating a subcarrier signal extracted from the clock signal, to communicate in accordance with NFC Type A 106 kbps protocol with intra-frame synchronization.

* * * * *